(12) United States Patent
Huang et al.

(10) Patent No.: US 10,113,444 B2
(45) Date of Patent: Oct. 30, 2018

(54) HEATED INLET GUIDE VANE

(71) Applicant: UNITED TECHNOLOGIES CORPORATION, Farmington, CT (US)

(72) Inventors: Jianming Huang, Old Lyme, CT (US); Brian C. Lund, Moodus, CT (US); Zhen Wu, Niantic, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 460 days.

(21) Appl. No.: 14/708,819

(22) Filed: May 11, 2015

(65) Prior Publication Data

US 2015/0345327 A1 Dec. 3, 2015

Related U.S. Application Data

(60) Provisional application No. 61/991,983, filed on May 12, 2014.

(51) Int. Cl.

| *F01D 5/08* | (2006.01) |
|---|---|
| *F01D 25/12* | (2006.01) |
| *F01D 9/02* | (2006.01) |
| *F01D 25/24* | (2006.01) |
| *F01D 5/02* | (2006.01) |

(Continued)

(52) U.S. Cl.
CPC ............. *F01D 25/12* (2013.01); *F01D 5/021* (2013.01); *F01D 9/02* (2013.01); *F01D 9/065* (2013.01); *F01D 25/02* (2013.01); *F01D 25/24* (2013.01); *F02C 7/047* (2013.01);

(Continued)

(58) Field of Classification Search
CPC ... F01D 25/02; F01D 5/00; F01D 5/08; F01D 5/021; F01D 25/10; F02C 7/047
See application file for complete search history.

(56) References Cited

U.S. PATENT DOCUMENTS 2,680,345 A * 6/1954 Frost ...................... F02C 7/047
244/134 C
3,123,283 A 3/1964 Leis
(Continued)

FOREIGN PATENT DOCUMENTS

JP 2011-021506 A 2/2011

OTHER PUBLICATIONS

European Search Report dated Sep. 21, 2015 for related EP Application Serial No. 15167403.3.

*Primary Examiner* — Igor Kershteyn
*Assistant Examiner* — Jason Fountain
(74) *Attorney, Agent, or Firm* — Cantor Colburn LLP

(57) ABSTRACT

A heated inlet guide vane is disclosed. The disclosed guide vane may include a body having an inlet cavity disposed alongside of an outlet cavity wherein the outlet cavity is disposed alongside the leading edge of the vane. The inlet cavity is in communication with a source of heated air. The inlet cavity is in communication with the outlet cavity by way of a plurality of impingement holes spaced along the inner wall disposed between the two cavities. Bleed holes are spaced along the length of the outlet cavity. Fresh, heated air enters the outlet cavity along the entire length of the outlet cavity and quickly exits the outlet cavity with minimal cooling so that a uniform d-icing capability is provided along the entire leading edge of the inlet guide vane.

20 Claims, 3 Drawing Sheets

(51) Int. Cl.
*F01D 9/06* (2006.01)
*F01D 25/02* (2006.01)
*F02C 7/047* (2006.01)

(52) U.S. Cl.
CPC .... *F05D 2220/32* (2013.01); *F05D 2260/201* (2013.01); *Y02T 50/676* (2013.01)

(56) References Cited

U.S. PATENT DOCUMENTS

| | | | |
|---|---|---|---|
| 4,883,404 A | 11/1989 | Sherman | |
| 5,029,440 A | 7/1991 | Graber et al. | |
| 7,637,715 B2 * | 12/2009 | Battisti | F03D 80/40 290/55 |
| 8,061,657 B2 * | 11/2011 | Rocklin | B64D 15/04 138/116 |
| 8,616,850 B2 * | 12/2013 | Ward | F01D 5/3007 416/204 A |

* cited by examiner

HEATED INLET GUIDE VANE

BACKGROUND

Technical Field

This disclosure relates generally to turbo machinery, more specifically to gas turbine engines for aircraft. Still more specifically, disclosed herein are heated inlet guide vanes for turbofan gas turbine engines.

Description of the Related Art

Turbofan gas turbine engines typically include a compressor section that includes a fan that delivers airflow to a low-pressure compressor that, in turn, compresses the airflow and delivers it to a high-pressure compressor. The high-pressure compressor further compresses the airflow and delivers it to a combustor. The air is mixed with fuel and combusted in the combustor, and the combustion gases pass downstream over rotors of high and low pressure turbines. The high and low-pressure turbines extract energy from the combustion gases and power the high and low pressure compressors respectively, in addition to producing useful work to propel the aircraft in flight.

To facilitate channeling of the airflow into the fan, gas turbine engines may include inlet guide vanes that are used to direct the airflow in a desired orientation toward the fan blades. Inlet guide vanes may be provided in fixed or variable configurations. Variable inlet guide vanes may be adjusted for various operating conditions and environments, often by pivoting the guide vanes about an axis to achieve the desired airflow characteristics. In addition to directing the fan airflow, the inlet guide vanes may also provide structural stiffness to the case surrounding the fan because the inlet guide vanes connect the nose cone or another core structure to the fan case.

Inlet guide vanes, along with other structural elements of aircraft and aircraft engines, may be susceptible of forming ice accumulation under certain operating and environmental conditions. Besides adding weight to the structures, ice accumulation often has a detrimental effect on performance through alteration of the surface texture and structural shape of the element undergoing ice accumulation.

Various approaches to addressing ice accumulation have been developed, including the use of heated air supplied from a source within the engine itself. Specifically, inlet guide vanes may be formed with a cavity or passageway that extends along the leading edge of the vane. As the heated air travels through the cavity and along the leading edge of the vane, the heated air is cooled as heat is transferred from the heated air to the leading edge of the vane. However, because the heated air is supplied at one end of the vane, the heated air may lose a substantial amount of heat by the time it reaches the other end of the vane before exiting the cavity and the vane through one or more outlets. As a result, the heated air becomes less effective at de-icing the vane as it travels through the cavity and, the end of the vane farthest from the heated air inlet will still be susceptible to ice accumulation.

Thus, there remains a need for an improved inlet guide vane heating system that effectively and efficiently addresses ice accumulation on leading edges of inlet guide vanes.

SUMMARY OF THE DISCLOSURE

In one aspect, an inlet guide vane is disclosed. The disclosed inlet guide vane may include a body that may have a first end and a second end. The body may further include an outer surface, a leading edge and a trailing edge. The body may further include an inlet cavity that extends between the first and second ends. Further, the body may include an outlet cavity extending between the first and second ends and between the inlet cavity and the leading edge. The body may further include an inner wall disposed between the inlet and outlet cavities. The inner wall may include a plurality of impingement holes that may provide communication between the inlet and outlet cavities. The body may further include a plurality of bleed holes that provide communication between the outlet cavity and the outer surface of the body, or the ambient atmosphere. The inlet cavity may be in communication with a source of heated air. Accordingly, heated air flows into the inlet cavity, through the impingement holes, into the outlet cavity and out of the inlet guide vane through the bleed holes.

Another disclosed inlet guide vane may include a body having a first end, a second end, an outer surface, a leading edge and a trailing edge. The body may further include an elongated inlet cavity that extends between the first and second ends. The body may also include an elongated outlet cavity that extends between the first and second ends and between the inlet cavity and the leading edge. The inlet cavity may be separated from the outlet cavity by an inner wall. The inner wall may include a plurality of impingement holes that provide communication between the inlet and outlet cavities. The body may further include a plurality of bleed holes that provide communication between the outlet cavity and the outer surface of the body, or the ambient atmosphere. The impingement holes may be longitudinally offset from the bleed holes and the inlet cavity may be in communication with a source of heated air. The heated air flows into the inlet cavity, through the impingement holes and into the outlet cavity and out of the outlet cavity through the bleed holes.

In another aspect, a gas turbine engine is disclosed which may include a compressor section that may include a fan. The fan may be surrounded by a case and connected to a nose. The nose may be connected to the case by a plurality of inlet guide vanes. Each inlet guide vane may include a body having a first end, a second end, an outer surface, a leading edge and a trailing edge. The body may further include an inlet cavity that may extend between the first and second ends as well as an outlet cavity that may also extend between the first and second ends. The outlet cavity may be disposed between the inlet cavity and the leading edge. The body may further include an inner wall that is disposed between the inlet and outlet cavities. The inner wall may include a plurality of impingement holes that provide communication between the inlet and outlet cavities. The body may further include a plurality of bleed holes that provide communication between the outlet cavity and the outer surface of the body. And, the inlet cavity may be in communication with a source of heated air that may flow through the inlet cavity, through the impingement holes, into the outlet cavity and out of the inlet guide vanes through the bleed holes.

In any one or more of the embodiments described above, the outlet cavity may be elongated and it may extend along the leading edge of the body.

In any one or more of the embodiments described above, the outlet cavity may be parallel to the leading edge of the body.

In any one or more of the embodiments described above, the inlet cavity may be elongated and extend parallel to the outlet cavity.

In any one or more of the embodiments described above, the plurality of impingement holes may be spaced-apart along the inner wall.

In any one or more of the embodiments described above, the plurality of bleed holes may be spaced-apart along the outer cavity.

In any one or more of the embodiments described above, the bleed holes and the impingement holes may be longitudinally set from one another.

In any one or more of the embodiments described above, the inlet cavity may be connected to a heated air passageway that extends through the first end of the body and into a first mount connected to the first end of the body. The first mount may include a heated air inlet port in communication with the source of heated air.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
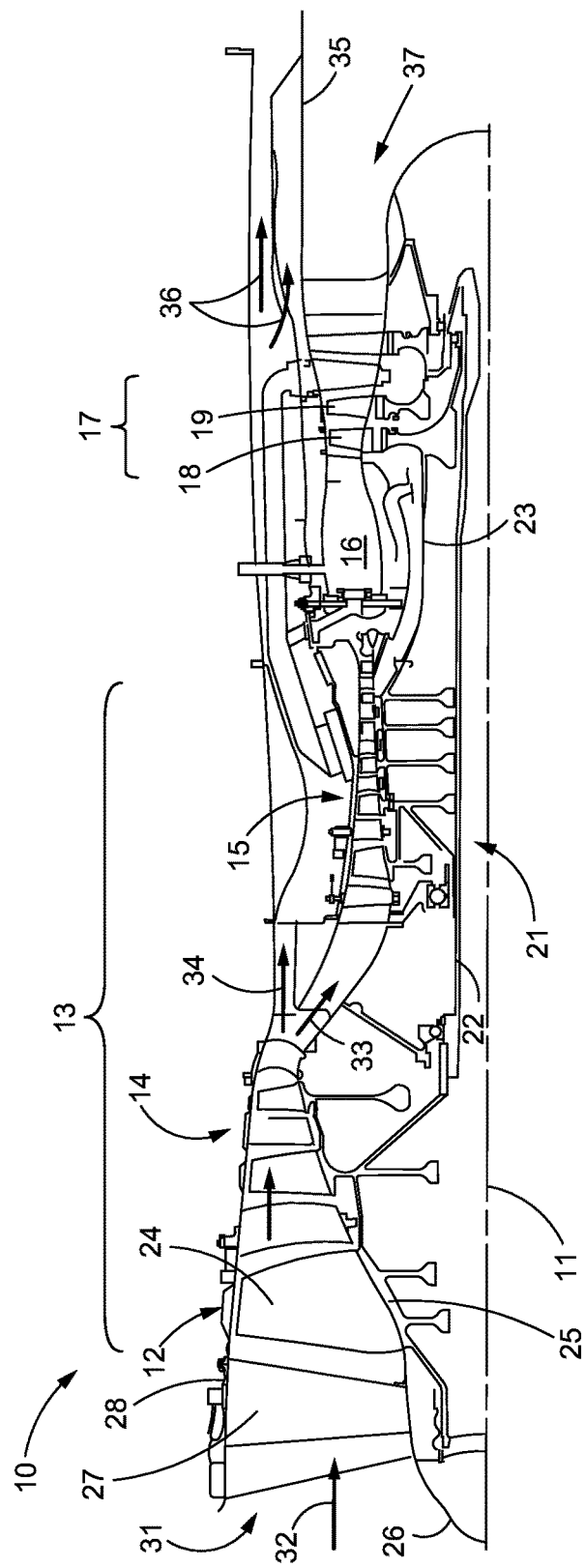
FIG. 1 is a cross-sectional view of an exemplary gas turbine engine that may incorporate the disclosed inlet guide vanes.

FIG. 1 is a cross-sectional and schematic illustration of an exemplary gas turbine engine 10 having a longitudinal axis 11. The gas turbine engine may include a fan 12 that may be part of the compressor section 13. The compressor section 13 may include a low-pressure compressor (LPC) 14 and a high-pressure compressor (HPC) 15. The compressor section 13 may be disposed upstream of a combustor 16. Opposite the combustor 16 from the compressor section 13 may be a turbine section 17. The turbine section 17 may include a high-pressure turbine (HPT) 18 and a low-pressure turbine (LPT) 19. The compressor section 13, turbine section 17 and combustor 16 all combine to form a core engine 21.

In the core engine 21, the LPT 19 is coupled to the LPC 14 by a low-pressure shaft 22 while the HPT 18 is coupled to the HPC 15 by a high-pressure shaft 23. The low-pressure shaft 22 may also be coupled to the fan 12.

The fan 12 may include an array of fan blades 24 that extend radially outwardly from a rotor 25. The rotor 25 may be coupled to a nose 26. The nose 26 may be coupled to an array of inlet guide vanes 27. The inlet guide vanes 27 may extend from the nose 26 to the fan case 28 and therefore provide structural integrity to the fan case 28 as the inlet guide vanes (IGVs) 27, in addition to directing airflow, may also act as spoke-like struts that extend radially outwardly from the nose 26 to the fan case 28. The inlet 31 to the fan case 28 may also include an array of struts and an air-particle separator (not shown).

In operation, air flows through the inlet 31 as indicated by the arrow 32 and engages the IGVs 27 as shown in FIG. 1. The IGVs 27 may be fixed or variable. Either way, the IGVs 27 are configured and positioned to direct the airflow 32 in a desired orientation towards the fan blades 24. As air flows through the fan 12, the rotating fan blades 24 compress the air before the air is channeled to the LPC 14, which further compresses the airflow and delivers a portion of the airflow to the HPC 15 as indicated by the arrow 33. Some of the airflow bypasses the HPC 15 as indicated by the arrow 34. This diverted airflow may be used for cooling purposes as it flows past the combustor 16, HPT 18 and LPT 19 before exiting through the exhaust 35 as indicated by the arrows 36.

The non-diverted airflow indicated by the arrow 33 is channeled into the HPC 15 where it is further compressed before it is channeled into the combustor 16. In the combustor 16, the compressed airflow is mixed with fuel and combusted so it forms combustion products in the form of combustion gases that are channeled to the HPT 18. As the combustion gases flow over the rotors of the HPT 18, the HPT 18 converts some of the energy from the combustion gases into useful work by rotating the HPT 18 which, in turn, rotates the shaft 23 which, in turn, rotates the HPC 15. The combustion gases flow from the HPT 18 to the LPT 19, which also converts energy from the combustion gases into useful work as rotation of the LPT 19 results in rotation of the shaft 22, the LPC 14 and the fan 12. Further, energy from the combustion gases also provide propulsion to the aircraft as the gases leave the LPT 19 through the nozzle 37.

The IGVs 27 extend radially outwardly from the nose 26 or other non-rotating structure to the fan case 28. The IGVs 27 may be circumferentially spaced about the nose 26 or the central axis 11 so that the IGVs 27 effectively guide the airflow 32 into the fan 12. In addition to the IGVs 27, outlet guide vanes, supporting struts and other structures may be provided upstream or downstream from the IGVs 27 and fan blades 24 for structural or aero dynamic purposes.

Figure 2:
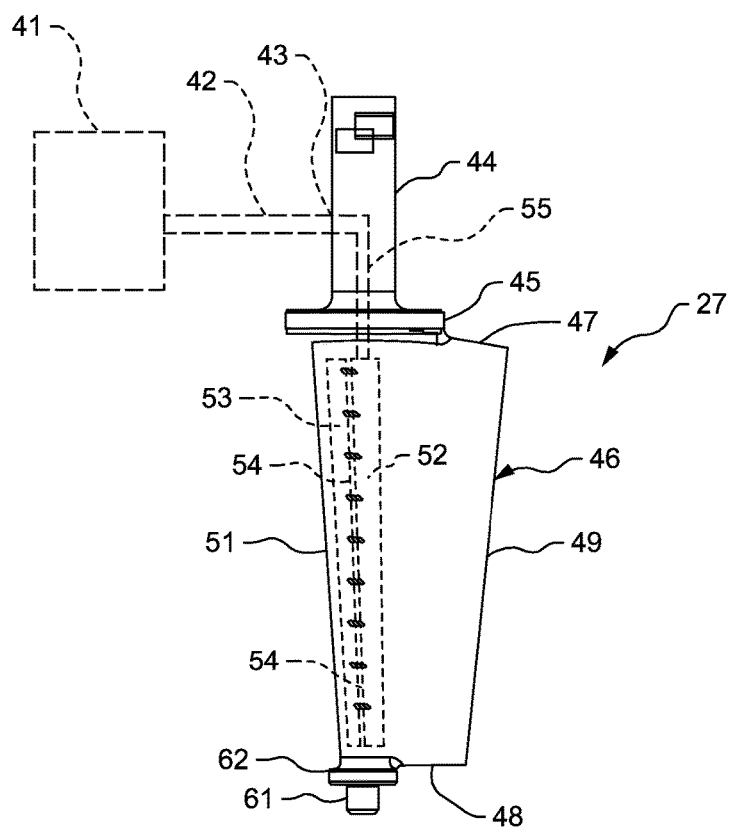
FIG. 2 is a front elevational view of a disclosed inlet guide vane showing the inlet cavity, the outlet cavity, the impingement holes, the bleed holes, the heated air passageway and the heated air inlet port in phantom.

FIG. 2 is an elevational view of a disclosed IGV 27 which may be in communication with a heated air source 41. The heated air source 41 may, in some embodiments, be part of or in communication with the HPC 15. Other sources of heated air in the gas turbine engine 10 include various sections of the exhaust 35 downstream or upstream from the combustor 16. The heated air source 41 may be in communication with each IGV 27 via a conduit 42 which may be connected to a heated air inlet port 43 disposed in the mount 44. The mount 44 may be connected to a flange 45 that, in turn, connects the mount 44 to the IGV body 46. The body 46 may include a first end 47, a second end 48, a trailing edge 49 and a leading edge 51. The body 46 may also include an inlet cavity 52, an outlet cavity 53 and an inner wall 54 that may separate the inlet cavity 52 from the outlet cavity 53. The inlet cavity 52 is in communication with a heated air passageway 55 that may be in communication with the heated air inlet port 43 and therefore the heated air source 41. Thus, air flows from the heated air source 41, through the conduit 42, through the inlet port 43, through the passageway 55 and into the inlet cavity 52.

Figure 5:
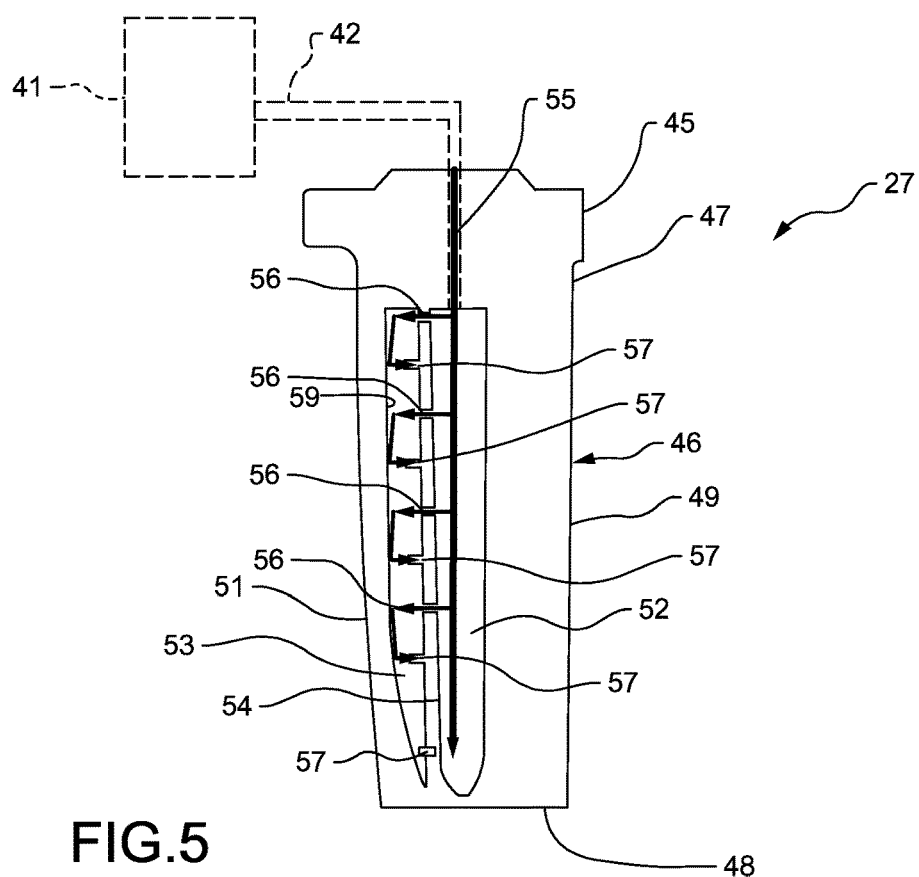
FIG. 5 is an enlarged, partial sectional view of the inlet guide vane shown in FIGS. 2 and 4.

The inner wall 54 separates the inlet cavity 52 from the outlet cavity 53. Communication between the inlet cavity 52 and the outlet cavity 53 is provided by a series of impingement holes 56 that extend through the inner wall 54 as best seen in FIG. 5. As also shown in FIG. 5, air exits the outlet cavity 53 via a plurality of bleed holes 57. The impingement holes 56 are spaced apart along the inner wall 54 between the first end 47 and the second end 48 of the body 46. Thus, heated air is delivered from the inlet cavity 52 along the entire length of the outlet cavity 53. By delivering heated air along the entire length of the outlet cavity 53 instead of introducing air just at one end of the outlet cavity 53, it is assured that fresh, heated air is delivered along the entire outlet cavity 53 and therefore along the entire leading edge 51 of the body 46. By providing heated air along the entire leading edge 51, the anti-icing capability of the IGV 27 may be essentially uniform across the entire length of the leading edge 51. In contrast, prior art IGVs often do not have a uniform de-icing capabilities across the entire leading edge because heated air is introduced at only one end of a cavity disposed in proximity to the leading edge of the IGV. In contrast, as shown in FIG. 5, airflow enters the inlet cavity 52 and is distributed evenly along the entire length of the outlet cavity 53 and the leading edge 51. Further, air exits the outlet cavity 53 along the entire length of the outlet cavity 53 via the bleed holes 57, which are also spaced-apart along the length of the outlet cavity 53 as shown in FIG. 5. Further, by spacing the bleed holes along the length of the outlet cavity 53, air is transferred from the inlet cavity 52, through one of the impingement holes 56 and into the outlet cavity where it engages an inner surface 59 of the outlet cavity 53 disposed adjacent to the leading edge 51. After the heated air engages the surface 59, it circulates out through a nearby bleed hole 57 as illustrated schematically in FIG. 5. Thus, heated air does not travel along the entire outlet cavity 53, which avoids the cooling problem associated with prior art structures. The heated air enters the outlet cavity 53 through an impingement hole 56, engages the surface 59 and exits through a nearby bleed hole 57 without passing along the entire length of the outlet cavity 53. Therefore, air at a uniform temperature and energy content is distributed along the entire outlet cavity 53, along the entire inner surface 59 and therefore along the entire leading edge 51.

Returning to FIG. 2, the second end 48 may also be connected to a mount 61 and a flange 62. The IGV 27 shown in FIG. 2 may be of a variable type, meaning that the IGV 27 or, more specifically, the body 46 may be rotated about an axis that passes through the mount 61 and the mount 44. Various actuator mechanisms for rotating or adjusting the IGVs 27 are available and will be apparent to those skilled in the art.

Figure 3:
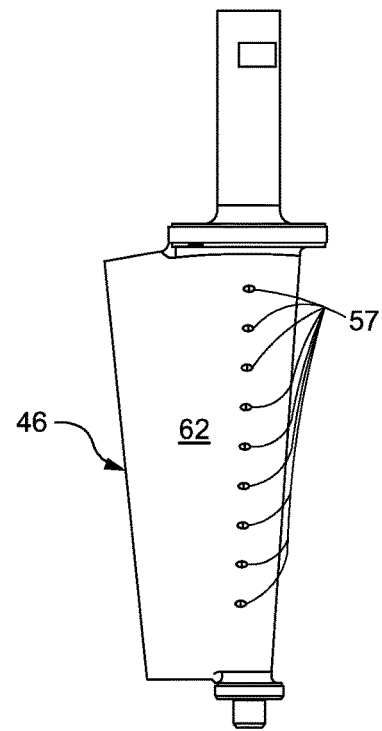
FIG. 3 is a rear elevational view of the inlet guide vane shown in FIG. 2.
Figure 4:
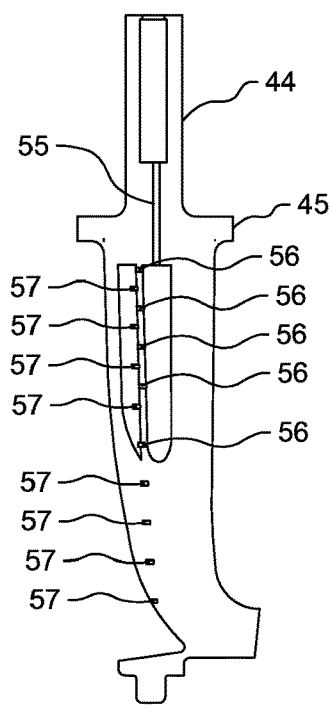
FIG. 4 is a sectional view of the inlet guide vane as shown in FIG. 2.

FIG. 3 illustrates the placement of the bleed holes 57 that extend through the outer surface 62 of the body 46. Like the impingement holes 56, the bleed holes 57 are spaced apart along the length of the outlet cavity 53. The spaced-apart configuration of the bleed holes 57, in combination with the staggered, yet spaced-apart configuration of the impingement holes 56 ensures that the air flows through the impingement holes, into the outlet cavity 53 and back out through the bleed holes 57 without traveling along the length of the outlet cavity 53. In other words, the spaced-apart placement of the impingement holes 56, in combination with the spaced-apart placement of the bleed holes 57, and the staggering of the bleed holes 57 or the placement of each bleed hole 57 between a pair of impingement holes 56 ensures that the heated air will enter the outlet cavity 53 through an impingement hole 56, engage the surface 59 before exiting through a nearby bleed hole 57 without traveling along the length of the outlet cavity 53. While the heated air is cooled as it engages the surface 59, it quickly exits through a bleed hole 57 without traveling along the length of the surface 59 or along the length of the outlet cavity 53. As a result, air of a relatively uniform temperature engages the surface 59 along the entire length of the surface 59 or the entire length of the outlet cavity 53. Hence, the IGV 27 will have uniform de-icing capabilities along the length of the IGV 27. The staggering or placement of the bleed holes 57 between two impingement holes 56 is further illustrated in the sectional view of FIG. 4.

INDUSTRIAL APPLICABILITY

An improved, heated inlet guide vane 27 is disclosed which provides uniform heated air distribution along an elongated outlet cavity 53 which provides heated air of a relatively uniform temperature along the entire length of the outlet cavity 53. As a result, the de-icing capability of the IGV 27 is relatively uniform along the length of the body 51 of the IGV 27, or from the first end 47 of the body 46 to the second end 48 of the body 46. The uniform air distribution is achieved by the use of a plurality of impingement holes that extend through the inner wall 54 that separates the outlet cavity 53 from the inlet cavity 52. By utilizing a plurality of impingement holes 56, spaced apart along the inner wall 54, fresh, heated air is introduced into the outlet cavity 53 along the entire length of the outlet cavity 53. Further, the use of a plurality of spaced-apart bleed holes 57 along the length of the outlet cavity 53 provides for a quick exit of the heated air after it engages the surface 59 of the cavity 53 that is disposed adjacent to the leading edge 51 of the IGV 27. The bleed holes 57 may also be staggered with respect to the impingement holes 56 or, in other words, each bleed hole 57 may be disposed between a spaced-apart pair of impingement holes 56.

Accordingly, a method for de-icing the IGV 27 is disclosed that includes providing a body 46 with a first end 47 and a second end 48 and wherein the body 46 includes an elongated inlet cavity 52 disposed alongside of an elongated outlet cavity 53 with an inner wall 54 separating the two cavities 52, 53. The method may further include forming or providing a plurality of spaced-apart impingement holes 56 in the inner wall 54 thereby providing communication from the inlet cavity 52 to the outlet cavity 53. The method may further include providing a plurality of spaced-apart bleed holes that provide communication between the outlet cavity 53 and the ambient atmosphere. In an embodiment, the bleed holes 57 may be staggered with respect to the impingement holes 56. Such a configuration provides for a uniform distribution of heated air in the outlet cavity 53 and an early exit of the heated air from the outlet cavity 53 which ensures that the d-icing capability of the IGV 27 is uniform along the leading edge 51.

While only certain embodiments of been set forth, alternative embodiments and various modifications will be apparent from the above description to those skilled in the art. These and other alternatives are considered equivalents and within the spirit and scope of the present disclosure.

What is claimed:

1. An inlet guide vane of a gas turbine engine, comprising:

an inlet cavity extending between a first end and a second end, the inlet cavity being in communication with a source of heated air, an outlet cavity extending between the first end and the second end and located between the inlet cavity and a leading edge of the inlet guide vane, an inner wall disposed between and separating the inlet cavity from the outlet cavity, the inner wall including a plurality of impingement holes providing communication between the inlet cavity and the outlet cavity, a plurality of bleed holes providing communication between the outlet cavity and an outer surface of the inlet guide vane;

wherein the plurality of bleed holes and the plurality of impingement holes are located such that heated air travelling from the inlet cavity to the outlet cavity through the inner wall via at least one of the plurality of impingement holes will exit from the outlet cavity through one of the plurality of bleed holes prior to it travelling along the entire length of the outlet cavity and wherein airflow into the outer cavity and out of the outer cavity is only provided by the plurality of impingement holes and the plurality of bleed holes.

2. The inlet guide vane of claim 1 wherein the outlet cavity is elongated in shape and extends along the leading edge.

3. The inlet guide vane of claim 2 wherein the inlet cavity is elongated in shape and parallel to the outlet cavity.

4. The inlet guide vane of claim 1 wherein outlet cavity is parallel to the leading edge.

5. The inlet guide vane of claim 4 wherein inlet cavity is parallel to the outlet cavity.

6. The inlet guide vane of claim 1 wherein the plurality of impingement holes are spaced-apart along the inner wall.

7. The inlet guide vane of claim 1 wherein the plurality of bleed holes are spaced-apart along the outlet cavity.

8. The inlet guide vane of claim 7 wherein the bleed holes and impingement holes are longitudinally offset from one another.

9. The inlet guide vane of claim 1 wherein the inlet cavity is connected to a heated air passageway that extends through the first end and into a first mount connected to the first end, the first mount including a heated air inlet port in communication with the source of heated air.

10. The inlet guide vane of claim 9 wherein the second end is connected to a second mount, the first and second mounts being coaxial.

11. An inlet guide vane of a gas turbine engine, comprising:

a body including a first end, a second end, an outer surface, a leading edge and a trailing edge, the body further including an elongated inlet cavity extending between the first end and the second end, the body further including an elongated outlet cavity extending between the first end and the second end and located between the inlet cavity and the leading edge, the inlet cavity being separated from the outlet cavity by an inner wall, the inner wall including a plurality of impingement holes providing communication between the inlet cavity and the outlet cavity, the body further including a plurality of bleed holes providing communication between the outlet cavity and the outer surface of the body, the impingement holes being longitudinally offset from the bleed holes, and the inlet cavity in communication with a source of heated air; and wherein the plurality of bleed holes and the plurality of impingement holes are located such that heated air travelling from the inlet cavity to the outlet cavity through the inner wall via at least one of the plurality of impingement holes will exit from the outlet cavity through one of the plurality of bleed holes prior to it travelling along the entire length of the outlet cavity and wherein airflow into the outer cavity and out of the outer cavity is only provided by the plurality of impingement holes and the plurality of bleed holes.

12. The inlet guide vane of claim 11 wherein the outlet cavity is parallel to the leading edge.

13. The inlet guide vane of claim 12 wherein the inlet cavity is parallel to the outlet cavity.

14. The inlet guide vane of claim 11 wherein the plurality of impingement holes are evenly spaced-apart along the inner wall.

15. The inlet guide vane of claim 11 wherein the plurality of bleed holes are evenly spaced apart along the outlet cavity.

16. The inlet guide vane of claim 11 wherein the inlet cavity is connected to a heated air passageway that extends through the first end of the body and into a first mount connected to the first end of the body, the first mount including a heated air inlet port in communication with the source of heated air.

17. The inlet guide vane of claim 16 wherein the second end of the body is connected to a second mount, the first and second mounts being coaxial.

18. A gas turbine engine, comprising:

a compressor section including a fan, the fan being surrounded by a case, the fan being connected to a nose, the nose being connected to the case by a plurality of inlet guide vanes, each inlet guide vane including a body including a first end, a second end, an outer surface, a leading edge and a trailing edge, the body further including an inlet cavity extending between the first and second ends, the body further including an outlet cavity extending between the first and second ends and located between the inlet cavity and the leading edge, the body further including an inner wall disposed between the inlet cavity and the outlet cavity, the inner wall separating the inlet cavity from the outlet cavity and the inner wall including a plurality of impingement holes providing communication between the inlet cavity and the outlet cavity, the body further including a plurality of bleed holes providing communication between the outlet cavity and the outer surface of the body, and the inlet cavity in communication with a source of heated air; and wherein the plurality of bleed holes and the plurality of impingement holes are located such that heated air travelling from the inlet cavity to the outlet cavity through the inner wall via at least one of the plurality of impingement holes will exit from the outlet cavity through one of the plurality of bleed holes prior to it travelling along the entire length of the outlet cavity and wherein airflow into the outer cavity and out of the outer cavity is only provided by the plurality of impingement holes and the plurality of bleed holes.

19. The gas turbine engine of claim 18 wherein the outlet cavity is elongated and extends along and is parallel to the leading edge.

20. The gas turbine engine of claim 19 wherein the inlet cavity is elongated and parallel to the outlet cavity.

* * * * *